United States Patent
Bendeck et al.

(10) Patent No.: US 7,240,832 B2
(45) Date of Patent: Jul. 10, 2007

(54) PAYMENT BRAND ANNOUNCEMENT AT A WIRELESS PAYMENT POINT OF SALE DEVICE

(75) Inventors: Mauricio A. Bendeck, Miami, FL (US); Alif M. Khawand, Miami, FL (US); Georg A. Mussenden, Boca Raton, FL (US)

(73) Assignee: Motorola, Inc., Schaumburg, IL (US)

( * ) Notice: Subject to any disclaimer, the term of this patent is extended or adjusted under 35 U.S.C. 154(b) by 84 days.

(21) Appl. No.: 11/026,787

(22) Filed: Dec. 31, 2004

(65) Prior Publication Data

US 2006/0144932 A1   Jul. 6, 2006

(51) Int. Cl.
*G06K 13/06* (2006.01)

(52) U.S. Cl. .................. 235/383; 235/380; 235/385; 705/14

(58) Field of Classification Search ........... 235/472.02; 902/22, 39
See application file for complete search history.

(56) References Cited

U.S. PATENT DOCUMENTS

| 6,199,753 B1 * | 3/2001 | Tracy et al. ................. 235/375 |
| 6,314,406 B1 * | 11/2001 | O'Hagan et al. ............. 705/14 |
| 6,512,919 B2 * | 1/2003 | Ogasawara .............. 455/422.1 |

* cited by examiner

*Primary Examiner*—Seung Ho Lee
(74) *Attorney, Agent, or Firm*—Scott M. Garrett

(57) ABSTRACT

A point of sale device (102) establishes a short range secure radio link (105) with a wireless payment device (104) to complete a transaction. The point of sale device transmits the transaction information to the wireless payment device (304) so the a user of the wireless payment device can approve the transaction (306). Upon approving the transaction, the wireless payment device transmits payment information to the point of sale device (308). The point of sale device uses the payment information to contact the appropriate payment source (110) to record the transaction. Upon the payment source confirming the transaction, the brand of the financial institution, card associations, and affinity groups acting as the payment source is announced so as to be observable by those in the vicinity of the point of sale device.

10 Claims, 2 Drawing Sheets

PAYMENT BRAND ANNOUNCEMENT AT A WIRELESS PAYMENT POINT OF SALE DEVICE

TECHNICAL FIELD

This invention relates in general to payment transactions occurring at a point of sale device, and more particularly to transactions approved via a wireless payment device by a customer, and wherein the brand of the financial institution, card associations, affinity groups, and third-party providers which the customer uses to complete the transaction is to be announced.

BACKGROUND OF THE INVENTION

Wireless devices continue to gain popularity, and with new, low power wireless interfaces, which require only a very small amount of circuitry, commonly used devices can now have wireless interfaces to exchange information with other devices. There are numerous examples of devices that use short range wireless interfaces to communicate with other devices, and some of the more well known are, for example, computer input devices such as keyboards and mice, cellular phone to automobile interfaces for so-called Bluetooth enabled cellular phones, identification cards, keyless entry systems, and so on.

One application for short range wireless communications is electronic payments at a point of sale. Rather than carry credit cards, checks or cash, a user can program a wireless payment device with the user's financial and banking information to enable a point of sale device to complete a transaction. One disadvantage of wireless payment for financial institutions is in using such a payment device the brand name of the financial institution, card associations, affinity groups, and third-party providers are not publicized. Presently, when a customer uses a credit card, for example, there is an opportunity for people to see the brand. The brand is the particular logo, mark, artwork, and other observable media the business has used in association with their products and services. In fact, financial institutions, card associations, affinity groups, and third-party providers offer a variety of artwork on the cards they issue to both attract customers and for others to see when the card is used by the customer. Although the exposure of the card to the view of others is typically very brief, with a short range wireless payment financial institutions loose even that brief exposure. Therefore there is a need for a means by which the brand of the financial institution, card associations, affinity groups, and third-party providers used in making a wireless payment can be announced and further publicized.

DETAILED DESCRIPTION

Figure 1:
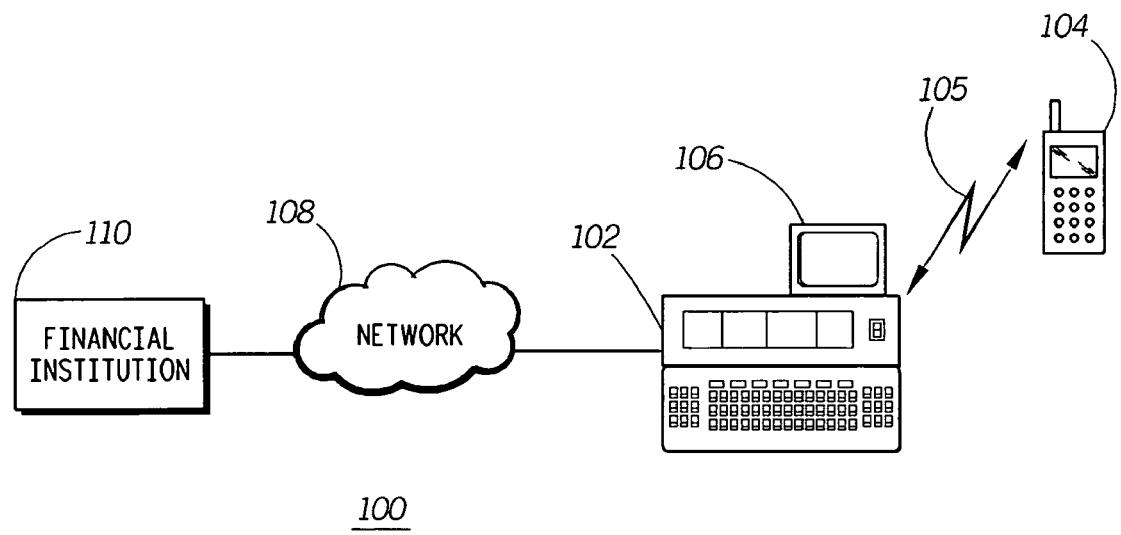
FIG. 1 shows a system diagram of a wireless point of sale system, in accordance with an embodiment of the invention.

While the specification concludes with claims defining the features of the invention that are regarded as novel, it is believed that the invention will be better understood from a consideration of the following description in conjunction with the drawing figures, in which like reference numerals are carried forward.

The invention solves the problem of the lack of brand exposure in a wireless payment transaction by providing the point of sale device with a brand announcement interface. Upon completing a transaction with a wireless payment device, the point of sale device retrieves a brand file which contains media to be used by the brand interface to announce the brand. The brand file can be stored locally, on the wireless payment device, or transmitted from the approving financial institution upon approving the transaction, for example. In this manner the brand of the financial institution is exposed to others in the vicinity of the point of sale device upon making the wireless payment.

Referring now to FIG. 1, there is shown a system diagram 100 of a wireless point of sale system, in accordance with an embodiment of the invention. A wireless point of sale device 102, such as an electronic and wirelessly enable cash register is operated by retailer, and used for recording sales and payment for items and service sold by the retailer. Typically the point of sale device is located in a conspicuous location at the retailer's establishment so as to be easy to find by customers. The point of sale device interacts with a wireless payment device 104 over a local, short range wireless channel 105. The wireless payment device is a computing device on which the user of the wireless payment device stores financial information, and may store additional other information on it as well. Furthermore, the wireless payment device may be integrated into another device, such as, for example, a mobile communication device. The wireless channel is a short range radio link. Many examples of which are currently in use such as, for example, radio link interfaces known by the trade names Bluetooth or ZigBee, each of which are described in IEEE specifications.

In one embodiment of the invention, when a user of the wireless payment device desires to pay for something at the point of sale, the wireless payment device and point of sale device establish a secure link over the radio channel 105. The point of sale device transmits transaction information to the wireless payment device for approval by the user of the wireless payment device. Once the user approves the transaction, payment information is transmitted to the point of sale device, including information regarding the financial institution and account the user is using to make the payment. The payment information is used by the point of sale device, or, alternatively, by a server to which the point of sale device is networked, to contact the financial institution 110, over a secure financial network 108.

When the transaction is approved by the financial institution, and the transaction is recorded, the point of sale device announces the financial institution's brand as well as the brand of the affinity group and association at a brand announcement interface 106. By announce it is meant that point of sale device provides an indication of the brand that may be observed by others in the vicinity. For example, the brand announcement interface may be used to play a short melody or song known to be associated with the brand, or it may show a graphical image or short video known to be associated with brand, or any combination thereof. In this way brand recognition of the financial institution's brand as well as the brand of the affinity group and association brand is reinforced. The announcement may be subdued such that only those in the immediate vicinity of the point of sale device may observe the announcement.

Figure 2:
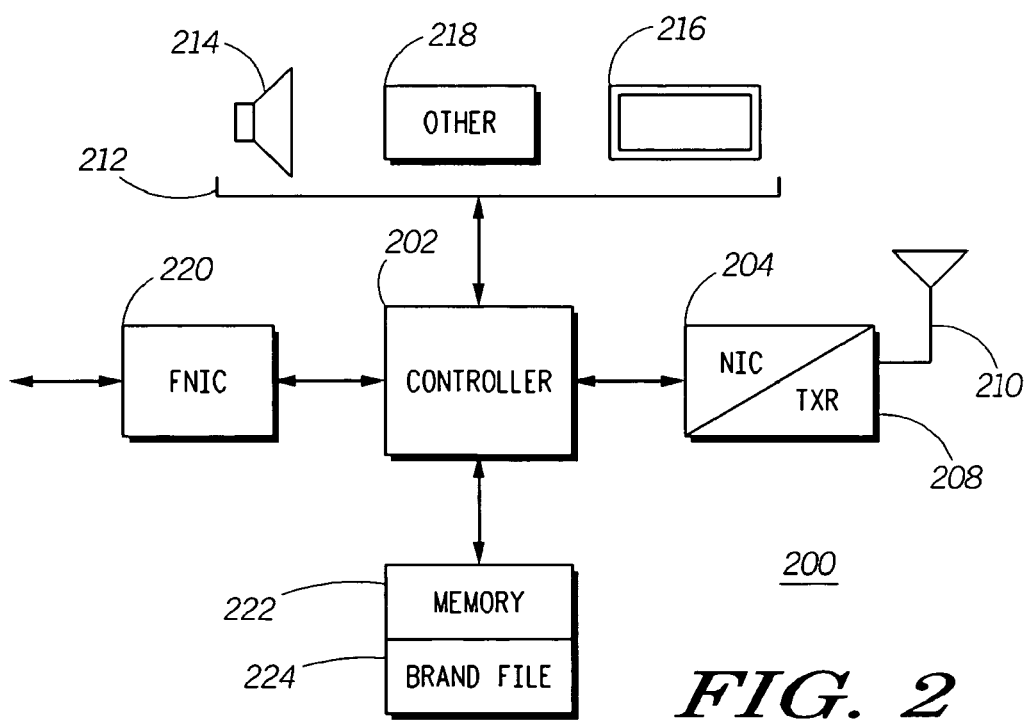
FIG. 2 shows a schematic block diagram of a wireless point of sale device for announcing a brand used in a payment transaction with a wireless payment device, in accordance with an embodiment of the device.

Referring now to FIG. 2, there is shown a schematic block diagram 200 of a wireless point of sale device for announcing a brand used in a payment transaction with a wireless payment device, in accordance with an embodiment of the device. Central to the operation of the point of sale device is a controller 202, which may include a microprocessor and supporting computer circuitry, as is known in the art. The controller controls the operation of various subsystems of the point of sale device, including a short range transceiver 204 for communicating with wireless payment devices in the vicinity of the point of sale device. The short range transceiver may include a network interface card circuit 204, and a radio transceiver 208, coupled to an antenna 210. The network interface card circuit 204 processes data for transmission, as well as the data received over the radio channel. The processing may include encryption and decryption for securing communications with the wireless payment device.

The controller is also coupled to a brand announcement interface 212, which may be a conventional audio/visual interface, as is known in the art. The brand announcement interface may include, for example, a speaker 214, display 216 such as a liquid crystal display, or other audio/visual means 218. One example of other audio/visual means may be one or more light panels which may include a plurality of colored lights for playing light patterns or sequences that result in a visual display indicative of a particular brand upon completion of a transaction. Any combination of these audio/visual elements may be present, and may be used to announce the brand associated with the transaction. Furthermore, in an alternative embodiment, it is contemplated that these elements may be included in the wireless payment device, which announces the brand upon completion of the transaction.

To record the transaction, the point of sale device is coupled to a financial network through a financial network interface card circuit 220. Although the connection to the financial network may be conventional, it is also contemplated that information in addition to the conventional transaction information may be transmitted over the financial network. For example, it is contemplated in one embodiment of the invention that the brand information, including a brand file containing brand media, may be transmitted over the financial network, where the brand media is used to announce the brand at the brand announcement interface. The payment source, such as a financial institution, is also coupled to the financial network, and thereby may be reached by the point of sale device, or equivalently, a server to which the point of sale device is coupled, to record the transaction.

In one embodiment of the invention, a memory 222 coupled to the controller is used to store brand files 224 for various financial institutions, card associations, affinity groups and third-party providers. Upon receiving the payment information from the wireless payment device, the controller fetches the corresponding brand file from memory and passes it to the brand announcement interface upon approval of the transaction, whereupon the brand interface will use the brand media file to announce the brand. The brand file, which contains the brand media file or files, may include a brand media descriptor to indicate what type of media is included in the brand media file. The brand media descriptor may be used by various point of sale devices having differing brand announcement capabilities to determine what portions of the brand media are needed and are compatible with the point of sale device's brand announcement interface.

Figure 3:
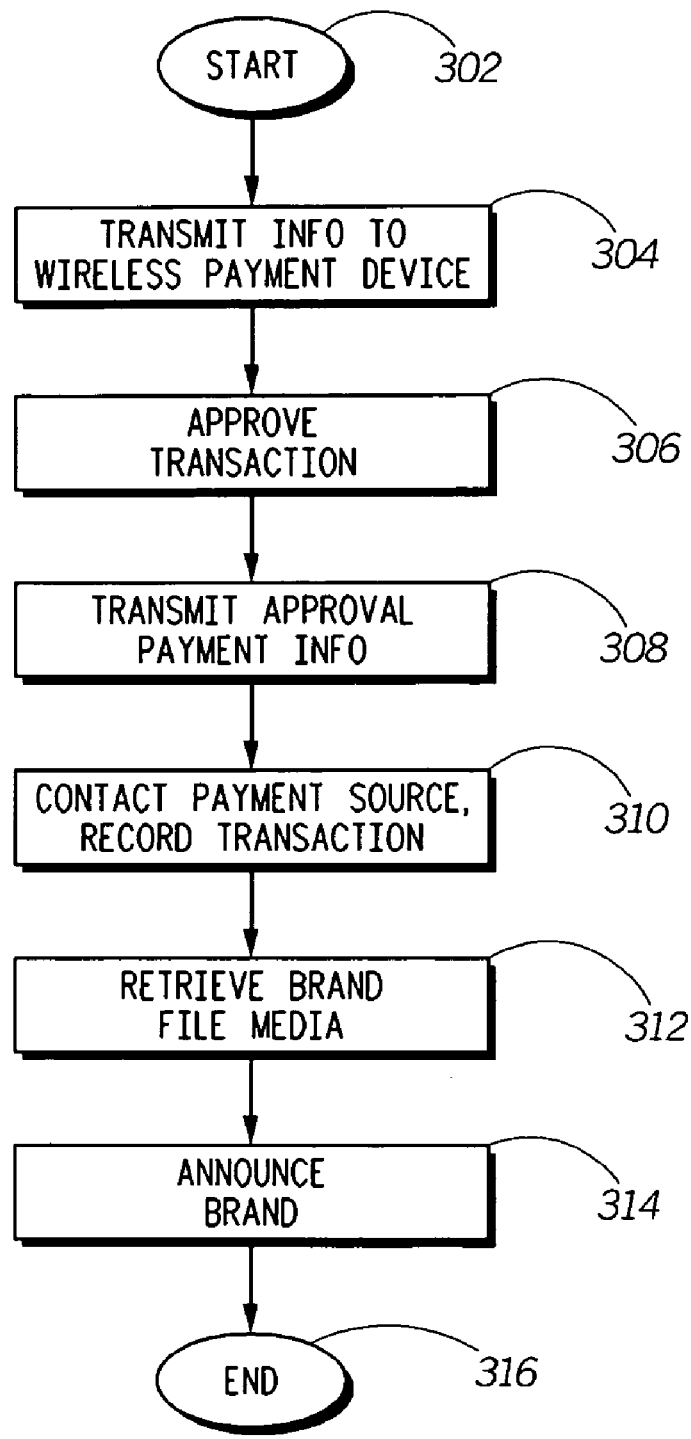
FIG. 3 shows a flow chart diagram of a method of announcing a brand used in a payment transaction with a wireless payment device at a wireless point of sale device, in accordance with an embodiment of the device.

Referring now to FIG. 3, there is shown a flow chart diagram 300 of a method of announcing a brand used in a payment transaction with a wireless payment device at a wireless point of sale device, in accordance with an embodiment of the device. More generally the method is a method of completing a purchase at a point of sale device with a wireless payment device. At the start 302 of the method, the point of sale device and the wireless payment device have established an initial link via one of any number of conventional short range radio link initiation protocols. According to the particular embodiment of the invention exemplified by FIG. 3, the point of sale device commences transmitting transaction information to the wireless payment device (304). The transaction information includes the total price to be charged, for example. The transaction information may be displayed by the wireless payment device so that the user of the wireless payment device may verify that the amount to be charged is the correct amount. The user then commences approving the transaction (306), by, for example, pressing a button corresponding to an affirmative reply. Upon the user approving the transaction the wireless payment device commences transmitting the approval to the point of sale device, including payment information (308). The payment information includes information needed by the point of sale device to reach the appropriate financial institution, card associations, affinity groups, and third-party providers used by the user of the wireless payment device for the transaction. For example, the payment information may include payment information that is usual and customary on data tracks 1-3 normally stored in conventional plastic credit cards magnetic stripes (ISO 7811). Using the payment information, the point of sale device commences contacting the payment source to record the transaction (310). The payment source is the financial institution used by the user of the wireless payment device which will provide the funds for the transaction. In response, the point of sale device will receive confirmation from the payment source. Upon receiving the confirmation, the point of sale device commences informing the wireless payment device of the confirmation, thereby completing the transaction. Additionally, the point of sale device retrieves the brand file associated with the payment source (312) and announces the brand (314) via the brand announcement interface. In an alternative embodiment, the wireless payment device announces the brand upon receiving confirmation of completion of the transaction from the point of sale device. In a further alternative embodiment the brand file includes brand media files for different individuals associated with the account being used to make the purchase, and the particular brand media file played is one associated with the particular individual making the purchase. Upon announcement of the brand, the method terminates (316). It is contemplated that upon termination of the method, a digital receipt may be delivered to the user of the wireless payment device by transmitting the digital receipt to the wireless payment device, or by other electronic delivery, such as email, as may be specified in the payment information transmitted to the point of sale device by the wireless payment device.

Therefore, in one embodiment of the invention, the invention provides a method of advertising a brand in a wireless payment transaction at a point of sale, commencing with receiving payment information at the point of sale device from the wireless payment device over a wireless channel.

Upon receiving the payment information, the point of sale device commences recording the transaction with the payment source used by the user of the wireless payment device. The payment source is contacted using the payment information which includes, for example, routing and account information normally found on data tracks used in magnetic stripe cards. Upon completing the transaction, the present embodiment commences announcing a brand associated with the payment information. The brand may be announced by the point of sale device, equipment coupled to the point of sale device, or by the wireless payment device. Announcement of the brand may be performed by any audio, visual, video, mechanical, or otherwise observable medium, or any combination thereof. The announcement is performed by causing a brand announcement interface to announce the brand in accordance with the media associated with the brand, such as by a brand file stored at the point of sale device, wireless payment device, or received from the payment source upon approving the transaction.

In another embodiment of the invention, the invention provides for a method of completing a purchase at a point of sale using a wireless payment device, commenced upon receiving transaction information at the wireless payment device from the point of sale device over a local wireless channel. The user of the wireless payment device then commences approving the transaction at the wireless payment device, which commences transmitting the approval of the transaction along with payment information to the point of sale device. Upon the point of sale device receiving the approval and payment information, it commences recording the transaction with the payment source indicated in the payment information. Upon completion of the transaction, the point of sale device commences announcing the brand associated with the payment information in a manner observable to those in the vicinity of the point of sale device.

The invention also provide for a point of sale device containing a wireless transceiver for wirelessly coupling to the wireless payment device and receiving payment information and transaction approval from the wireless payment device, a network interface coupled to a financial network, a brand announcement interface, and a controller for controlling operation of the wireless transceiver, network interface, and brand announcement interface. Furthermore, the point of sale device may include a memory for storing a plurality of brand files, where each one of the plurality of brand files corresponds to a different payment source. A brand file includes a brand media file which may include an audio media file or a visual media file, for example, and wherein the brand media file is used in announcing the brand on the brand announcement interface.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method of advertising a brand in a wireless payment transaction at a point of sale, comprising;
   receiving payment information at a point of sale device from a wireless payment device over a wireless channel;
   recording a transaction with a payment source using the payment information, performed by the point of sale device; and
   announcing a brand associated with the payment information;
   wherein recording the transaction comprises receiving from the payment source a brand file, the brand file including a brand media file selected from at least one of an audio file and a visual file, and wherein the brand media file is used in announcing the brand at the point of sale device.

2. A method of advertising a brand as defined in claim 1, further comprising transmitting to the wireless payment device transaction information for approval by a user of the wireless payment device, and wherein receive payment information is performed in response to the user approving the transaction information.

3. A method of advertising a brand as defined in claim 1, wherein announcing the brand comprises a visual announcement.

4. A method of advertising a brand as defined in claim 1 wherein announcing the brand comprises an audible announcement.

5. A method of advertising a brand as defined in claim 1, wherein announcing the brand is performed by the wireless payment device.

6. A method of completing a purchase at a point of sale using a wireless payment device, comprising:
   receiving transaction information at the wireless payment device from a point of sale device over a local wireless channel;
   approving a transaction at the wireless payment device;
   transmitting an approval of the transaction and payment information to the point of sale device from the wireless payment device;
   receiving the approval and payment information at the point of sale device;
   recording the transaction with a payment source using the payment information, performed by the point of sale device; and
   announcing a brand associated with the payment information at the point of sale device;
   wherein recording the transaction comprises receiving from the payment source a brand file, the brand file including a brand media file selected from at least one of an audio file and a visual file, and wherein the brand media file is used in announcing the brand at the point of sale device.

7. A method of completing a purchase as defined in claim 6, wherein announcing the brand comprises a visual announcement.

8. A method of completing a purchase as defined in claim 6 wherein announcing the brand comprises an audible announcement.

9. A method of completing a purchase as defined in claim 6, wherein announcing the brand comprises retrieving the brand file from a memory coupled to the point of sale device.

10. A point of sale device, comprising:
    a wireless transceiver for wirelessly coupling to a wireless payment device and receiving payment information and transaction approval from the wireless payment device;
    a network interface coupled to a financial network;
    a brand announcement interface having at least one of a visual announcement device and an audible announcement device;

a controller for controlling operation of the wireless transceiver, network interface, and brand announcement interface; and a memory for storing a plurality of brand files, each one of the plurality of brand files corresponding to a different payment source, the brand file including a brand media file selected from at least one of an audio media file and a visual media file, and wherein the brand media file is used in announcing the brand on the brand announcement interface.

* * * * *